United States Patent
Chen

(10) Patent No.: US 7,035,977 B2
(45) Date of Patent: Apr. 25, 2006

(54) METHOD AND SYSTEM FOR STACK-CACHING METHOD FRAMES

(75) Inventor: Cheng-Che Chen, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 319 days.

(21) Appl. No.: 10/417,260

(22) Filed: Apr. 17, 2003

(65) Prior Publication Data
US 2004/0158678 A1   Aug. 12, 2004

(30) Foreign Application Priority Data
Feb. 7, 2003   (TW) ............... 92102502 A

(51) Int. Cl.
*G06F 12/00* (2006.01)
(52) U.S. Cl. ...................... 711/132; 711/118
(58) Field of Classification Search ............... 711/118, 711/132, 170, 154, 156
See application file for complete search history.

(56) References Cited

U.S. PATENT DOCUMENTS

| 4,530,049 A | * | 7/1985 | Zee ............................ 711/132 |
| 5,043,870 A | * | 8/1991 | Ditzel et al. ................. 711/132 |
| 5,636,362 A | * | 6/1997 | Stone et al. ................. 711/129 |

* cited by examiner

*Primary Examiner*—T Nguyen
(74) *Attorney, Agent, or Firm*—Bacon & Thomas, PLLC

(57) ABSTRACT

A system and a method for stack-caching method frames are disclosed, which utilize FSO (Frame Size Overflow) flag to control the execution mode of the processor. When FSO flag is set, it indicates that the method frame of the next method is larger than the limit value of a stack cache so that the method frame is placed to a memory stack. When FSO flag is cleared, it indicates that the method frame of the next method is smaller than the limit value of the stack cache so that the method frame is placed into the cache stack.

16 Claims, 5 Drawing Sheets

METHOD AND SYSTEM FOR STACK-CACHING METHOD FRAMES

BACKGROUND OF THE INVENTION

1. Field of the Invention

The present invention pertains to speeding up the Java processor in executing bytecodes, and more particularly to a method and a system for stack-caching method frames on a Java platform.

2. Description of Related Art

In conventional programming language, the source code is compiled into specific machine code by a processor. The machine code is thus executed in a specific processor. If it is desired to execute the program in a different processor, the source code must be re-complied into the machine code of that processor.

Java is an object-oriented programming language and has the features of cross-platform and concise bytecodes. To achieve the capability of cross-platform in Java, the source code is converted into bytecodes in compiling, wherein the bytecodes are virtual machine (VM) instructions for executing the Java program, instead of being the instructions of a specific processor. In executing a Java program, the bytecodes are sequentially translated into instructions for a specific processor by a bytecode interpreter, which is a component of the Java virtual machine. Accordingly, after being compiled into bytecodes, the Java program can be executed in any platform and operating system with Java virtual machine platform.

Such a Java program suffers a disadvantage in that the execution speed is low. As known, the conventional machine codes obtained from compiling a program can be directly executed in a processor. However, the bytecodes obtained from compiling the Java program must be interpreted into machine codes by a Java virtual machine for being executed one a processor, resulting in requiring one additional process.

One solution to overcome the aforementioned problem is to use a Java processor capable of directly executing the bytecodes without the interpretation of the byecode. The Java processor is a stack-based processor, wherein, in any time, the stack-based processor only executes a single method, i.e., the current method.

FIG. 1 is a schematic diagram of the use a stack cache 1 showing the address space of method. The stack cache 1 is temporarily stored with at least one method frame 11, which defines an address space corresponding to the method. Each method frame 11 includes a plurality of frame components, such as object reference 111, arguments 112, local variables 113, frame state 114 and operand stack 115 for performing operations, invoking method, and accessing local variables. The frame state may include the return program counter, return frame, return constant pool, current method vector and current monitor address.

In the operation of a Java processor, the stack cache 1 is operated as follows. At first, data is read from the local variables 113 and pushed into the operand stack 115. Operand is popped from the operand stack 115 for some computation, and the result is pushed into the operand stack 115. Logically, it can be considered that the local variables 113 are at the bottom of the stack cache 1. The frame state 114 is above local variables and the operand stack 115 is at the top.

In the process of executing the bytecodes by the Java processor, the operand stack 115 may grow continuously to be out of the stack cache 1. Therefore, an auto spill and fill mechanism is employed. When the operand stack 115 grows and the usable space of the stack cache is reduced to a predetermined level, the auto spill mechanism is enabled so that data at the bottom of the stack cache 1 is moved to the memory (not shown) (hereinafter, the space of the memory for storing the stack is named as memory stack) for increasing the usable space of the stack cache 1. Therefore, in operating the Java processor, the local variables 113 may be stored in the stack cache 1 or in the memory stack.

FIG. 2 schematically illustrates the operation of a conventional Java processor. When desiring to access the local variables 113 (step 201), it is necessary to determine whether the local variable 113 to be accessed is stored in the stack cache 1 or in the memory stack, wherein VARS is pointer for the local variables, and BOS points to the bottom of the stack cache. A link register points to the memory stack corresponding to the bottom of the stack cache 1. When performing the auto spill and fill, the link register serves as base for spilling from and filling in the memory. For example, when the "iload" instruction is executed and the N-th local variable must be accessed, the Java processor must determine whether the VARS+N is smaller than BOS. If yes, it represents that the local variables are currently stored in the memory stack, and the value of the local variable is stored at the memory address (VARS+N)*4 (step S202). If not, it represents that the local variable is stored in the stack cache 1, and the value of the local variable is stored in the stack cache entry pointed by VARS+N (step S203).

In the execution stage of the Java processor, when desiring to access the local variables, it is necessary to determine whether the local variable 113 is stored in the stack cache or in the memory stack for processing different processes, respectively, which may result in a complicated and error-prone hardware for a pipelined processor. Besides, if the local variables are stored in the memory stack, the required memory access operation including addition and multiplication operations will spend a lot of time, resulting in a low executing performance.

SUMMARY OF THE INVENTION

Accordingly, the primary object of the present invention is to provide a method and a system for stack-caching method frames for reducing the hardware complexity and increasing the operation speed of the processor.

Another object of the present invention is to provide a method and a system for stack-caching method frames, wherein the processor can access the local variables directly from the stack cache without using the memory stack.

In accordance with one aspect of the present invention, there is provided a method for stack-caching method frames, which comprises the steps of: (A) storing at least one method frame in a memory stack or a stack cache for operating, invoking method, returning and accessing local variables, wherein the stack cache has a capacity limit; (B) if the FSO flag is in a clear state and the size of next method frame is larger than the capacity limit, changing the FSO flag into a set state and moving content in the stack cache to the memory stack so that the memory stack serves to store said method frame; (C) if the FSO flag is in the clear state and the size of next method frame is smaller than the capacity limit, storing the method frame in the stack cache; (D) if the FSO flag is in the set state and the size of next method frame is smaller than the capacity limit, changing the FSO flag into the clear state and activating an auto spill and fill mechanism so that the stack cache serves to store the method frame for accessing data; and (E) if the FSO flag is in the set state and the size of next method frame is larger than the capacity limit, storing the method frame in the memory stack.

In accordance with another aspect of the present invention, there is provided a system for stack-caching method frames, which comprises: a stack cache for temporarily storing at least one method frame having a size, the stack cache having a capacity limit; a memory having a handler table and a memory stack; and a processor having a frame size overflow (FSO) flag for controlling its execution mode. When the FSO flag is in a set state, the processor executes a method through the memory stack and the handler table. When the FSO flag is in a clear state, the processor executes a method through the stack cache.

The various objects and advantages of the present invention will be more readily understood from the following detailed description when read in conjunction with the appended drawing.

BRIEF DESCRIPTION OF THE PREFERRED EMBODIMENTS

Figure 1:
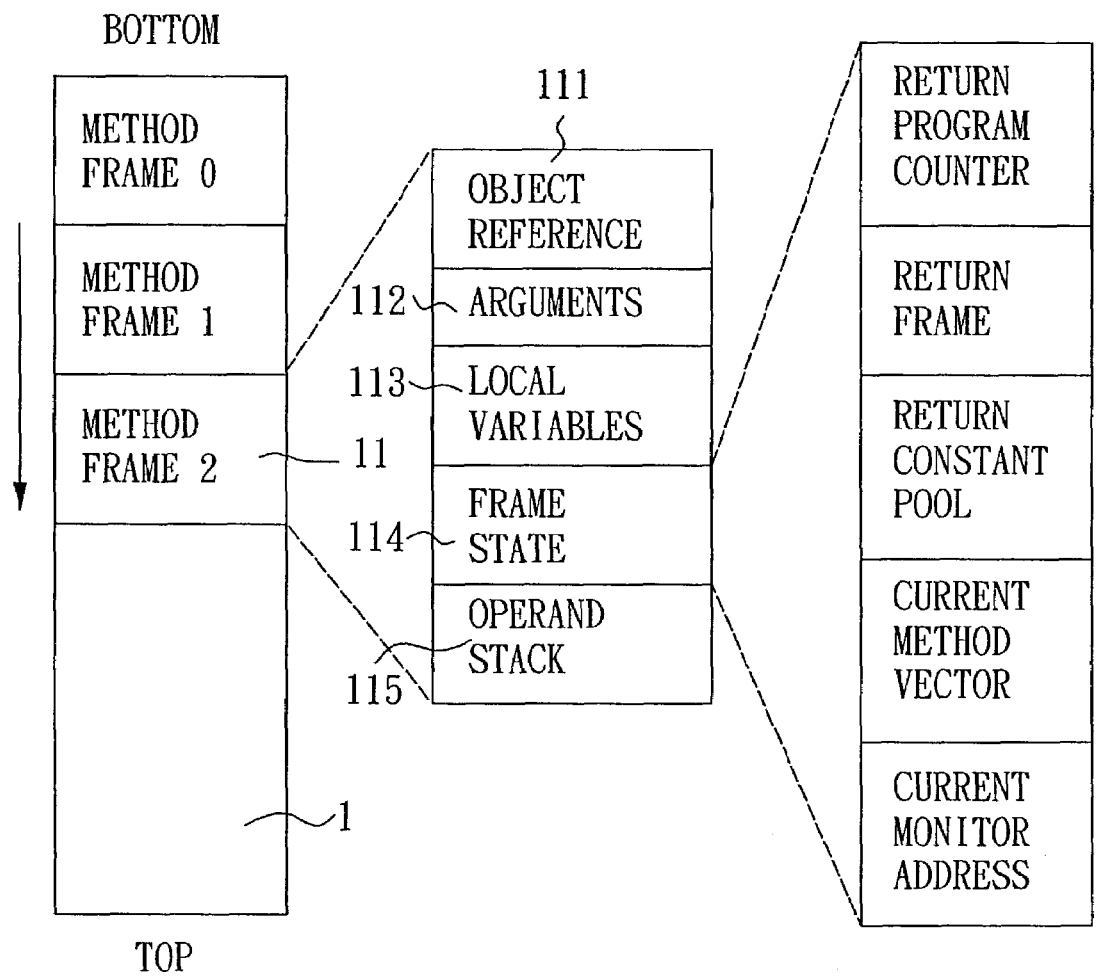
FIG. 1 is a schematic view showing that method frames are placed in a stack cache.
Figure 2:
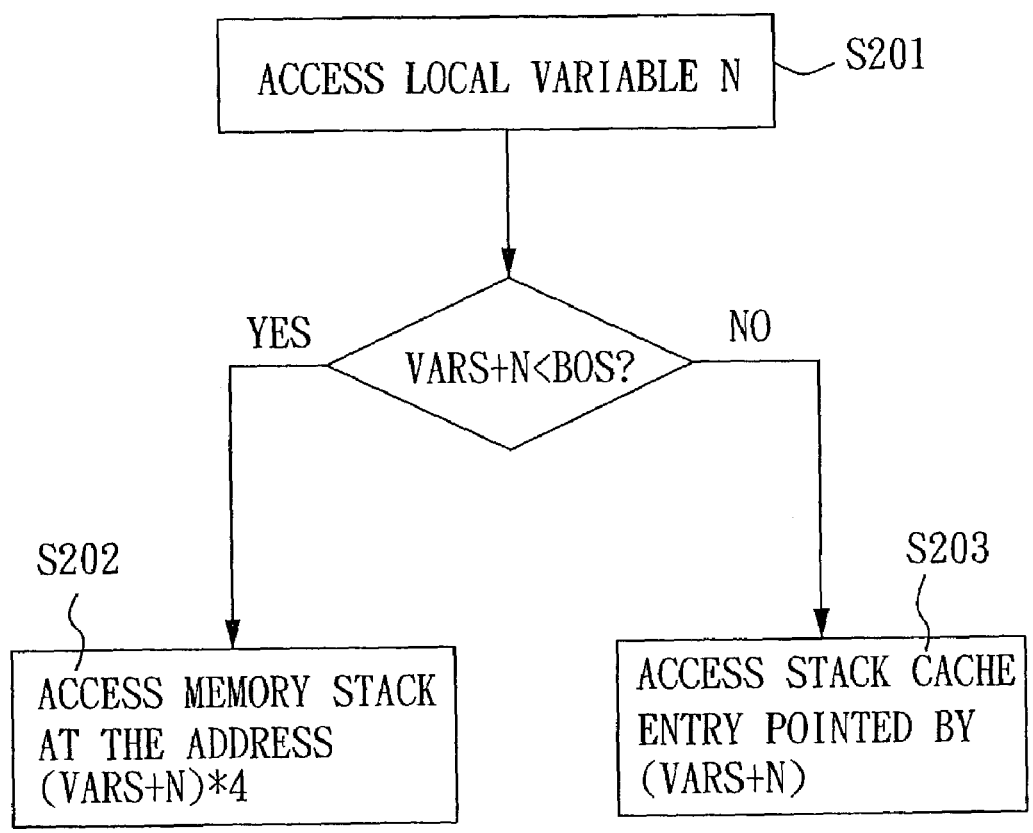
FIG. 2 is a flowchart showing the execution of the conventional Java processor.
Figure 3A:
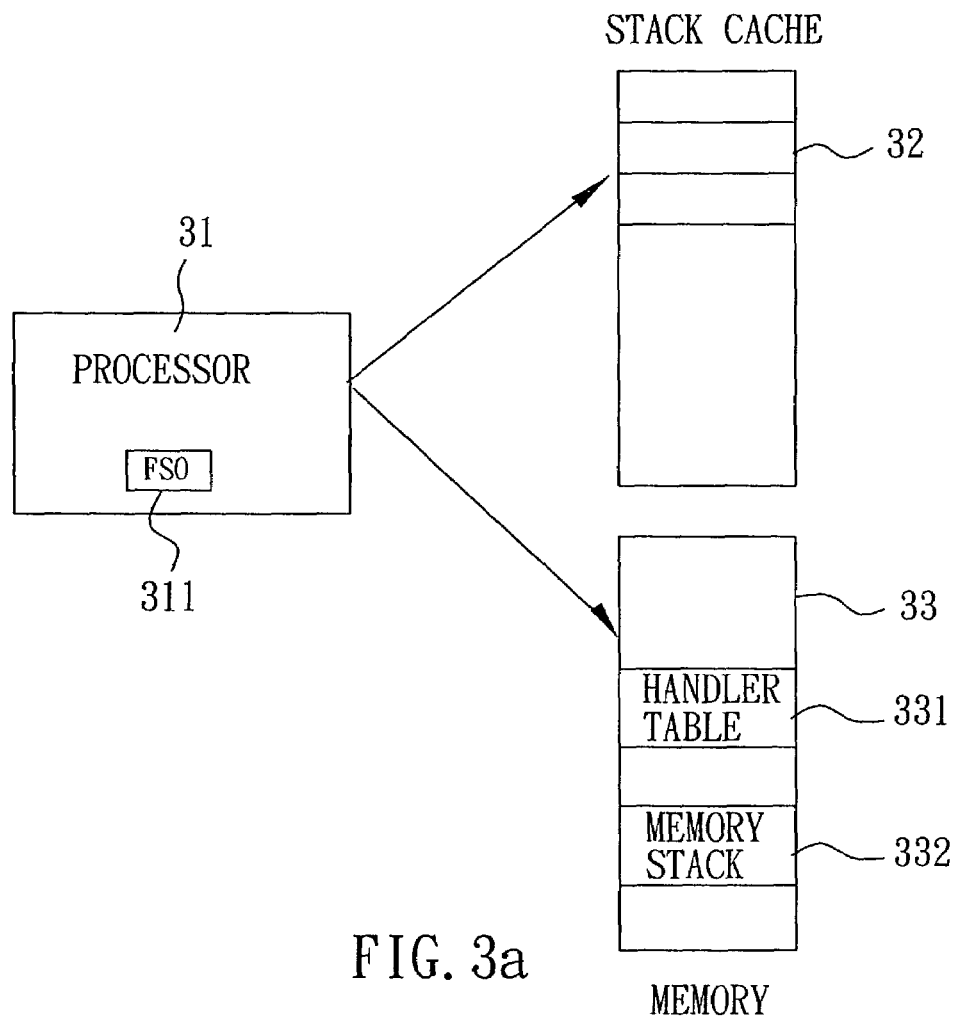
FIG. 3a is a schematic view showing the system structure in accordance with the present invention.

Referring to FIG. 3a, the system architecture of the present invention is illustrated, which includes a processor 31, a stack cache 32 and a memory 33. The processor 31 is a stack-based processor, in which a frame size overflow (FSO) flag is used to control the execution mode of the processor 31. The FSO flag 311 can be provided in a register or in other controller.

Figure 3B:
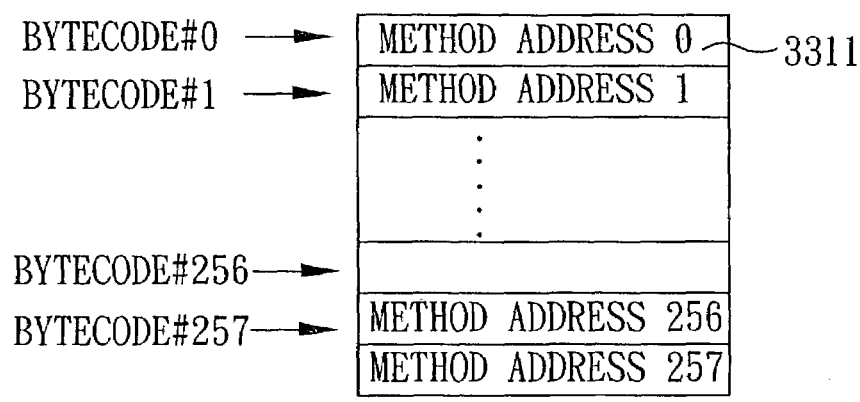
FIG. 3b is a schematic view showing the content of the handler table in accordance with the present invention.

The memory 33 has a handler table 331 and a memory stack 332. FIG. 3b shows the content of the handler table 331, which includes a plurality of method addresses 3311, each method address 3311 corresponding to a bytecode for allowing returning the corresponding method address 3311 in the handler table 331. Therefore, the virtual machine can jump to the method address 3311 so as to execute complicated bytecodes by software. For example, when a processor 31 processes a bytecode of "iadd", the bytecode is processed by hardware directly, since such a bytecode only relates to stack access and operation including popping two operands from a stack, adding the two operands and pushing the result into the stack.

When the processor 31 processes a 'new' bytecode, a complicated hardware is required to process such a bytecode since it relates to memory allocation and garage collection. Therefore, this bytecode is processed by software through a virtual machine. The processor 31 can record the attribute of the bytecode into a table (not shown), so as to be aware of which bytecodes are processed by hardware and which bytecodes are processed by software. Therefore, in decoding the bytecode, the processor can generate control signals according to the table, so that, in the executing stage, the processor 31 can process the bytecode directly or find a method address 3311 corresponding to the bytecode from the handler table 331 for executing the bytecode by software.

Figure 4:
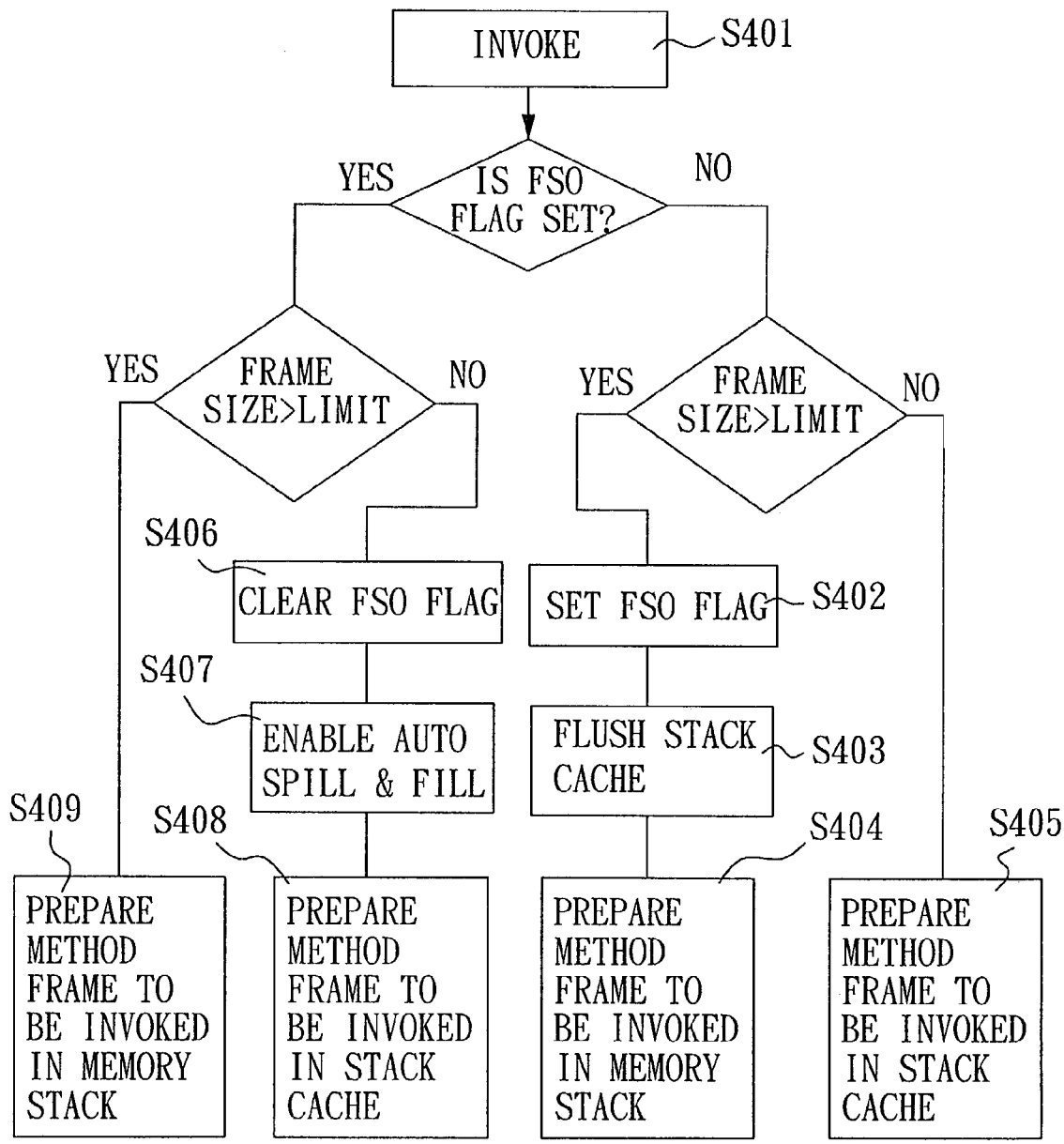
FIG. 4 shows the flowchart of method invocation process in accordance with the present invention.

FIG. 4 shows the flowchart of method invocation process in accordance with the present invention. As shown, also referring to FIGS. 3a and 3b, when the processor 31 invokes (step S401) a method, the FSO flag 311 in the register is checked firstly. If the FSO flag 311 is in a clear state, it is further checked whether the size of the method frame of the method to be invoked by the processor 31 is larger than the capacity limit of the stack cache 32. Herein, the size of the method frame includes the number of the local variables, the size of the frame state and the size of the operand stack. The number of the local variables and the size of the operand stack can be obtained from class file. The size of frame state is based on the design of the processor 31. Therefore, before invoking a method, the size of the method frame can be determined.

If the size of the method frame is larger than the capacity limit of the stack cache 32, it indicates that the method frame of the method to be invoked cannot be completely placed in the stack cache 32 and thus the state of the FSO flag is changed into the set state. (step S402) to enter a FSO mode. Moreover, stack cache 32 is flushed to move data therein to the memory stack 332 of the memory 33 (step S403) so that the memory stack 332 can be placed with the method frame. Then, the bytecode execution is performed by software and any access to the method frame (including the access to the operand stack and local variables) is achieved by accessing to the memory stack 332 (step S404).

If the size of the method frame is smaller than the capacity limit of the stack cache 32, it indicates that the method frame of the method to be invoked can be placed in the stack cache 32 completely. Therefore, the state of FSO flag is not changed for remaining in a non-FSO mode. The method frame is directly placed in the stack cache 32 so as to access the method frame through hardware directly (step S405).

If the FSO flag 311 is in a set state, and the size of the method frame is smaller than the capacity limit of the stack cache 32, it indicates that system is in the FSO mode and the method frame of the method to be invoked can be placed in the stack cache 32 completely. Therefore, the system should be changed into non-FSO mode for better performance. Accordingly, the FSO flag 311 is cleared (step S406), and the auto spill and fill mechanism is enabled (step S407). Moreover, the method frame is placed in the stack cache 32 for being accessed through hardware (step S408).

If the FSO flag 311 is in the set state, and the size of the method frame is larger than the capacity limit of the stack cache 32, it indicates that the system is in the FSO mode and the method frame of the method to be invoked cannot be placed in the stack cache 32 completely. Therefore, the system is not necessary to be changed into the non-FSO mode. Accordingly, the FSO mode is maintained and the method frame is placed in the memory stack 332 for being assessed through software (step S409).

Figure 5:
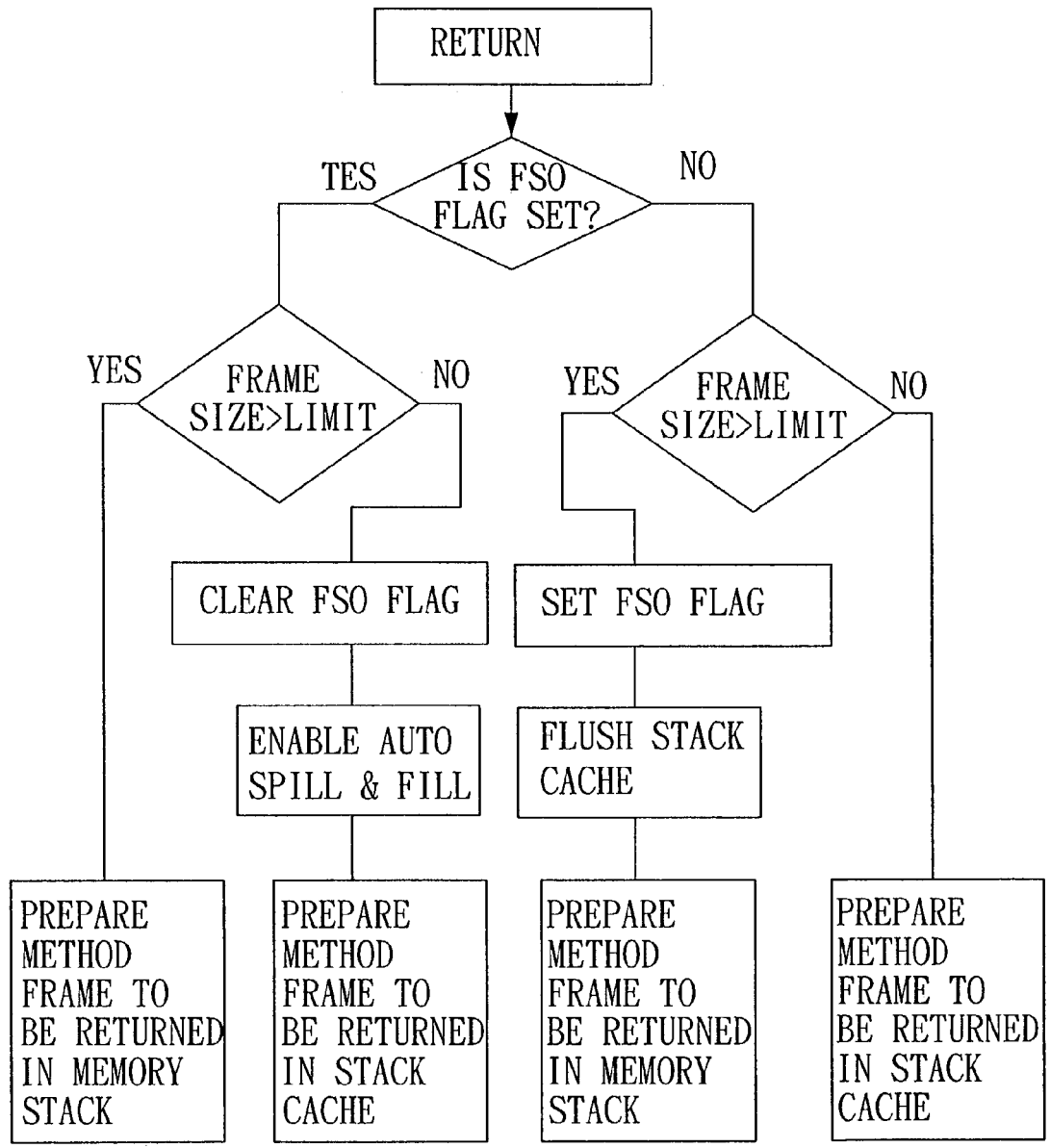
FIG. 5 shows the flowchart of method returning process in accordance with the present invention.

FIG. 5 shows the flowchart of method returning process in accordance with the present invention. As shown, the processor 31 performs similar steps as those illustrated in FIG. 4. Therefore, a detailed description is deemed unnecessary.

In view of the foregoing, it is known that, in the present invention, when the virtual machine finds that the next method frame cannot be completely placed in the stack cache 32, a FSO flag is set for entering into the FSO mode, so that, when the processor processes an bytecode, the bytecode is processed by software (a virtual machine). When the virtual machine finds that the next method frame can be completely placed in the stack cache, the FSO flag is cleared for entering into the non-FSO mode, so that, when desiring to access the local variables in the executing stage, the processor can directly access the data via the stack cache without determining whether the local variables is in the memory. Therefore, the complexity of the hardware can be reduced and the speed of the processor is improved.

Although the present invention has been explained in relation to its preferred embodiment, it is to be understood that many other possible modifications and variations can be made without departing from the spirit and scope of the invention as hereinafter claimed.

What is claimed is:

1. A method for stack-caching method frames used with a stack-based processor using a frame size overflow (FSO) flag to control its execution mode, the method comprising the steps of:
   (A) storing at least one method frame in a memory stack or a stack cache for operating, invoking method, and returning and accessing local variables, wherein the stack cache has a capacity limit;
   (B) if the FSO flag is in a clear state and a size of a next method frame is larger than the capacity limit, changing the FSO flag into a set state and moving content in the stack cache to the memory stack so that the memory stack serves to store said method frame;
   (C) if the FSO flag is in the clear state and the size of next method frame is smaller than the capacity limit, storing the method frame in the stack cache;
   (D) if the FSO flag is in the set state and the size of the next method frame is smaller than the capacity limit, changing the FSO flag into the clear state and activating an auto spill and fill mechanism so that the stack cache serves to store the method frame for accessing data; and
   (E) if the FSO flag is in the set state and the size of the next method frame is larger than the capacity limit, storing the method frame in the memory stack.

2. The method as claimed in claim 1, wherein the size of the method frame includes plural kinds of data.

3. The method as claimed in claim 2, wherein the plural kinds of data includes the number of local variables, frame states and operand stacks.

4. The method as claimed in claim 2, wherein the plural kinds of data are predetermined.

5. The method as claimed in claim 1, wherein in steps (B) and (E), a Java method corresponding to the stored method frame is executed by software and an access to the Java method is performed via the memory stack.

6. The method as claimed in claim 1, wherein in steps (C) and (D), a Java method corresponding to the stored method frame is performed by hardware and an access to the Java method is performed via the stack cache.

7. A system for stack-caching method frames comprising:
   a stack cache for temporarily storing at least one method frame having a size, the stack cache having a capacity limit;
   a memory having a handler table and a memory stack for storing a method frame that exceeds the capacity limit; and
   a processor having a frame size overflow (FSO) flag for controlling its execution mode;
   wherein when the FSO flag is in a set state, the processor executes a method corresponding to a method frame stored in memory stack through the memory stack and the handler table, and when the FSO flag is in a clear state, the processor executes a method corresponding to a method frame stored in the stack cache through the stack cache.

8. The system as claimed in claim 7, wherein the handler table has a plurality of method addresses, each corresponding to a bytecode, for allowing the processor to obtain a method address from the handler table so that a virtual machine can jump to the method address to execute the bytecode by software.

9. The system as claimed in claim 7, wherein the processor uses the stack cache to execute a Java method through the stack cache directly by hardware, the Java method corresponding to the stored method frame.

10. The system as claimed in claim 7, wherein when the FSO flag is in the clear state and the size of next method frame is larger than the capacity limit, the FSO flag is changed into the set state and content of the stack cache is moved to the memory stack so that the memory stack is stored with the method frame.

11. The system as claimed in claim 7, wherein when the FSO flag is in the clear state and the size of a next method frame is smaller than the capacity limit, the method frame is directly stored in the stack cache.

12. The system as claimed in claim 7, wherein when the FSO flag is in the set state and the size of the next method frame is smaller than the capacity limit, the FSO flag is changed into the clear state and content of the stack cache is moved to the memory stack so that the memory stack is stored with the method frame, and an auto spill and fill mechanism is enabled so that the method frame is placed in the stack cache for being accessed.

13. The system as claimed in claim 7, wherein when the FSO flag is in a set state and the size of the next method frame is larger than the capacity limit, the method frame is directly placed in the memory stack.

14. The system as claimed in claim 7, wherein the size of the method frame includes plural kinds of data.

15. The system as claimed in claim 14, wherein the plural kinds of data includes the number of local variables, frame states and operand stacks.

16. The system of claim 15, wherein the plural kinds of data are predetermined.

* * * * *